Aug. 11, 1970  V. J. FOWLER  3,524,145
BEAM DEFLECTION APPARATUS
Filed June 29, 1966  2 Sheets-Sheet 1

INVENTOR.
VERNON J. FOWLER

BY R. J. Frank
ATTORNEY

United States Patent Office 3,524,145
Patented Aug. 11, 1970

3,524,145
BEAM DEFLECTION APPARATUS
Vernon J. Fowler, East Meadow, N.Y., assignor to General Telephone & Electronics Incorporated, a corporation of Delaware
Filed June 29, 1966, Ser. No. 561,563
Int. Cl. H01s 3/00
U.S. Cl. 331—94.5                                    11 Claims

ABSTRACT OF THE DISCLOSURE

An apparatus for generating a moving beam of light which includes a piezoelectric delay line positioned within the resonant cavity of a laser oscillator in the path of the laser beam. Means are provided for establishing a shear wave in the delay line. The portion of the laser beam passing through the sheared portion of the delay line is perturbed. Means are then provided for removing the perturbed portion of the beam from the laser cavity.

---

This invention relates to image generating apparatus and in particular to apparatus for producing a moving beam of light by the use of a scanning element positioned within the cavity of a laser.

The rapid movement of a spot of light across a surface is required in many types of apparatus such as television displays and line scan film recording devices. The desired light spot displacement can be achieved by the use of direct view or projection television cathode ray tubes, or by a laser having a deflection device external to the laser cavity. Deflection devices of the later kind employing electro-optic or piezoelectric mirror deflectors are disclosed in copending U.S. patent applications Ser. Nos. 313,041 (issued as U.S. Pat. 3,357,771 on Dec. 12, 1967) and 514,454 filed Oct. 1, 1963 and Dec. 17, 1965 respectively by Carl F. Buhrer and Vernon J. Fowler and in copending patent application Ser. No. 518,324 filed Jan. 3, 1966 by Vernon J. Fowler.

Cathode-ray tube deflection devices are suitable for many applications but present certain disadvantages when used for TV display or high speed line scan recording. For example, the brightness of the image obtained from a television tube is limited by the phosphor response, and the deflection resolution is governed by the minimum spot size of the electron beam. Further, for high speed line scan recording, cathode ray tubes are often unsatisfactory because the afterglow of the phosphor obscures very fast recording signals. Fast decay phosphors may be used to minimize the afterglow but this results in a sacrifice of light intensity.

External electro-optic deflection devices used in conjunction with a laser provide a rapid scan but the maximum angular deflection that can be achieved is somewhat limited. Piezoelectric mirror deflectors, due to their inherent inertia, do not always provide a retrace motion which is as rapid as may be required in a particular application.

Accordingly, it is an object of my invention to provide improved image generating apparatus capable of providing a moving light beam of sufficient brightness for use in television display applications.

Another object of the invention is to provide beam scanning apparatus having fast response, large angular deflection and good resolution.

Yet another object is to provide beam scanning apparatus which provides a light trace having substantially zero decay time.

In accordance with the present invention, apparatus is provided for generating a moving beam of electromagnetic energy by the use of a signal responsive imaging device placed within the resonant cavity of a laser. The resonant cavity is provided with at least first and second spaced reflecting surfaces. The active laser medium is positioned within the cavity between the reflecting surfaces and, when excited by a source of external energy, emits a beam of coherent light.

The imaging device is disposed within the cavity so as to intercept the beam emitted by the active laser medium. The device is substantially transparent to the light emitted by the active laser medium and, when no signal is applied thereto, possesses optical properties which are essentially uniform throughout its volume. That is, the refractive index, light transmission and reflectivity are constant when no signal is applied to the imaging device. Application of a signal to the imaging device produces a change in the optical properties of an incremental portion thereof. Consequently, while most of the light emitted by the laser medium continues to pass through the imaging device in both directions and recirculate within the cavity, a perturbation is created in the wave front of the light striking the surface of the incremental portion having modified optical properties. The perturbed portion of the light is then extracted from the cavity.

One form of imaging device comprises a scanner consisting of a transparent acoustic delay line having electrodes secured to one end thereof. When a voltage is applied between the electrodes, an acoustic shear wave propagates down the line producing a traveling birefringent incremental volume having a refractive index different from that of the rest of the delay line. As a result, a traveling perturbation is produced in the wave front of the light beam striking the delay line and this portion of the light energy may be extracted to produce a scanning light source.

Most of the light generated within the cavity is unaffected by the scanner and continues to circulate between the reflecting surfaces. Only that portion of the light energy which has passed through a portion of the scanner having a different refractive index from the rest of the element is removed from the cavity. In order to produce a useful deflection of the portion of the beam extracted from the cavity and to obtain as large a number of resolvable spots as possible, it is necessary for the internal beam to have a large enough cross-sectional area to impinge upon an appreciable portion of the scanner. This may be obtained by the use of a multiple mirror or mirror and lens configuration as shall be explained hereinafter.

Since the path of the perturbed light within the cavity will, in general, be different from the portion of the beam which has maintained phase coherence, the portion of the light beam wave front affected by the change in refractive index of the scanner may be separated from the rest of the beam by a spatial filter. This filter consists of a reflecting surface having an aperture located so as to allow the unperturbed portion of the beam to pass through the filter while the perturbed portion is reflected out of the cavity. Alternatively, a polarization filter may be used which discriminates between differences in polarization of the two portions of the beam.

The above objects of and the brief introduction to the present invention will be more fully understood and further objects and advantages will become apparent from a study of the following description in connection with the drawings, wherein.

Figure 1:
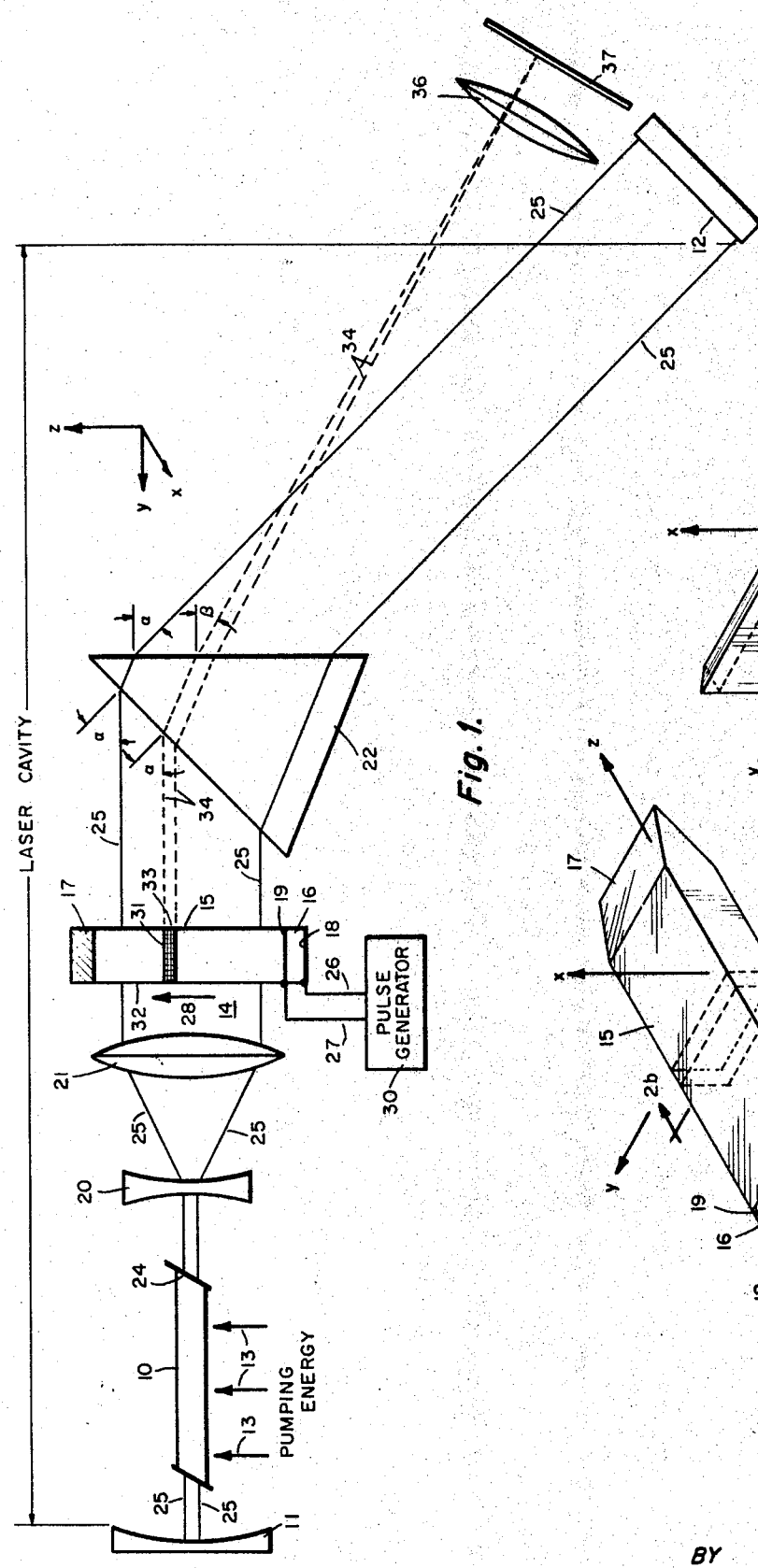
FIG. 1 is a schematic diagram showing image generating apparatus employing a scanning device situated within a laser cavity and a polarization filter for removing energy from the cavity.

Referring to FIG. 1, there is shown a schematic representation of one embodiment of the image generating apparatus I have invented. In this apparatus, an active laser medium 10 is located between two reflecting surfaces 11 and 12 forming an optical cavity. The active medium 10 may be composed of any of several well known materials having at least two atomic states or energy levels separated in energy by an amount corresponding to a characteristic output frequency. When the medium 10 is excited by a source of external pumping energy indicated by the arrows 13, the atomic particles within the medium are excited into the higher of the two energy levels thereby producing an inverted population. The active medium 10 emits coherent light as the atomic particles return from the higher energy level to the lower energy level. Medium 10 may comprise a solid, a liquid or a gas. Typically, argon or a mixtur of helium and neon gases in a conventional discharge tube may be employed as shown schematically in FIG. 1.

The pumping source indicated by arrows 13 may comprise any source of energy capable of exciting the molecules or ions in the medium 10 from a lower energy level into the higher energy level. A xenon flash tube and a radio-frequency generator are examples of suitable pumping sources.

The inner surface of reflector 11 consists of a fully reflective concave spherical mirror and the inner surface of reflector 12 may be a plane mirror.

Located between the medium 10 and reflector 12 is a scanning device 14. Scanner 14 consists of a delay line 15 which may be made, for example, of fused quartz having a piezoelectric transducer 16 at one end and an energy absorbing termination 17 at the other end. As shown in greater detail in FIG. 2a, the piezoelectric transducer, which may be composed of crystalline quartz, has a first electrode 18 bonded to one surface and a second electrode 19 bonded between the transducer 16 and the delay line 15. The transducer is oriented relative to the electrodes so that application of a voltage between the electrodes produces shearing strains which are transmitted to the delay line 15 and propagate down the line as a traveling shear-wave pulse. The termination 17, which is in the form of a triangular pyramid, is silvered and coated with lead to absorb energy from shear waves produced by applying a voltage across electrodes 18 and 19.

A pair of substantially non-reflective lenses 20 and 21 are placed between the laser medium 10 and the scanner 14. The lens system enlarges the light beam emitted by medium 10 so that the width of the beam is large compared to the size of the scanning element 15. As a result, a relatively large number of resolvable spot positions is obtained and the beam is well collimated.

A calcite prism 22 having its optic axis in the $x$ direction (perpendicular to the plane of the drawing) is positioned between scanner 14 and reflector 12. As is well known, light that is plane polarized in the direction of the optic axis is refracted at the interfaces of the prism and emerges as the "ordinary" beam at an angle determined by the angle of incidence of the beam and the refractive index of the prism 22. Light polarized in a plane perpendicular to the optic axis is also refracted at the interfaces of the prism 22 and emerges as the "extraordinary" beam from the crystal. The angles at which the "extraordinary" and "ordinary" beams emerge from prism 22 are different for orthogonally polarized input beams having the same angle of incidence.

The light emerging from medium 10 is plane polarized in the $x$ direction. When a gas discharge tube is employed as the laser medium, polarization may be produced by quartz plates positioned at the Brewster angle which also serve as the discharge tube windows. Alternatively, a prism polarizer located within the cavity may be used.

With no signal applied across transducer 16, the delay line 15 has a uniform refractive index throughout its entire volume. When sufficient pumping energy is supplied to the medium 10 as indicated by arrows 13, the population of the upper of two atomic states within medium 10 is made greater than that of the lower state. Some of the atoms in the upper state decay spontaneously to the lower state and in doing so emit light. Since medium 10 is in a resonant cavity formed by the reflectors 11 and 12, the emitted light excites one of the resonant modes of the cavity inducing further coherent emission within the cavity. Thus, a coherent electromagnetic beam of light having its outer boundaries represented by solid lines 25 is developed within the cavity.

The coherent light beam represented by lines 25 is plane polarized in the $x$ direction. This beam is incident on prism 22 at an angle $\alpha$ to the vertical of the output surface in the same plane of polarization. The beam 25 strikes the surface of reflector 12 and is reflected back through the cavity to the spherical surface of reflector 11 thereby producing a resonant condition which results in the continuous emission of coherent radiation from medium 10.

Figure 2B:
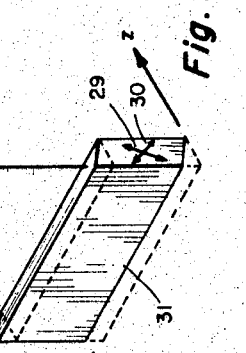
FIGS. 2a and 2b show details of a scanning device for use in the apparatus of FIGS. 1, 3 and 4.

Now, if a voltage is applied across electrodes 18 and 19 through leads 26 and 27 by pulse generator 30, the piezoelectric transducer 16 is caused to vibrate. The vibration of transducer 16 causes a narrow shear wave to be transmitted along the fused quartz delay line 15 in the $z$ direction shown by arrow 28. As each incremental volume of the delay line 15 (for example section 31 in FIG. 2a) is subjected to the shear wave its cross-section is distorted from rectangular to a parallelogram shown in exaggerated form in FIG. 2b. The shear wave deforms portion 31 of bar 15 setting up principal stress axes at an angle of about 45° relative to the polarization direction of the light, as indicated by arrows 29 and 30. These principal stress axes are in the $x$-$z$ plane at 45° to the $x$ and $z$ axes. As a result, the stressed portion 31 of the delay line 15 becomes birefringent with optic axes in the same direction as the principal stress axes. Light passing through the stressed portion emerges polarized in a plane orthogonal to that of the plane of polarization of the light emitted by medium 10 and impinges upon prism 22.

Figure 2A:
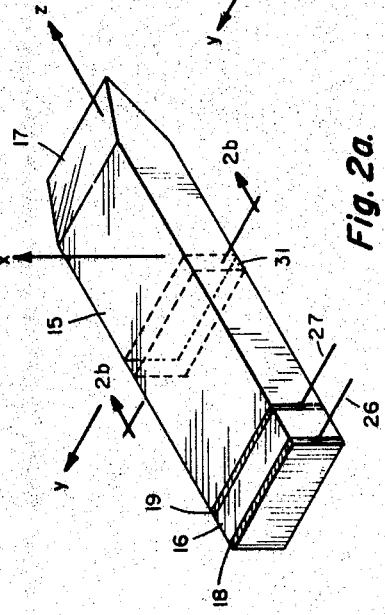

In FIG. 1, the portion of delay line 15 which is being stressed by the shear wave at a given instant is indicated by the numeral 31 corresponding to the section shown in FIG. 2a. The light striking the surface 32 of the stressed incremental volume is plane polarized in the $x$ direction but, due to the birefringence produced by the shear wave, the light emerging from the incremental volume 31 at surface 33 is elliptically polarized in the $x$-$y$ plane with a strong polarization component orthogonal to that of the incident beam. The beam emerging from the incremental volume 31 is represented by dashed lines 34. Beam 34 impinges upon the surface of prism 22 at the angle $\alpha$ but, since it is largely polarized in a plane orthogonal to that of beam 25, much or all of it is refracted through a different angle by prism 22, and emerges from the prism at an angle $\beta$ with the vertical. As previously explained, the different angles of refraction for the two beams 25 and 34 is due to the different refractive indices of prisms 22 for the two directions of polarization.

Since beam 34 emerges from the prism at a different angle than beam 25 it may be separated therefrom, focussed by lens 36 and projected on screen 37. Thus, as the incrementally stressed volume 31 travels from transducer 16 to termination 17, an image of the stressed portion is projected on screen 37.

If the scanning device 14 were located outside the laser cavity only a very small portion of the total incident laser beam power would appear in the output beam. However, by placing the scanner 14 within the cavity, that light which does not actually appear in the scanner output beam is recirculated within the cavity.

Figure 3:
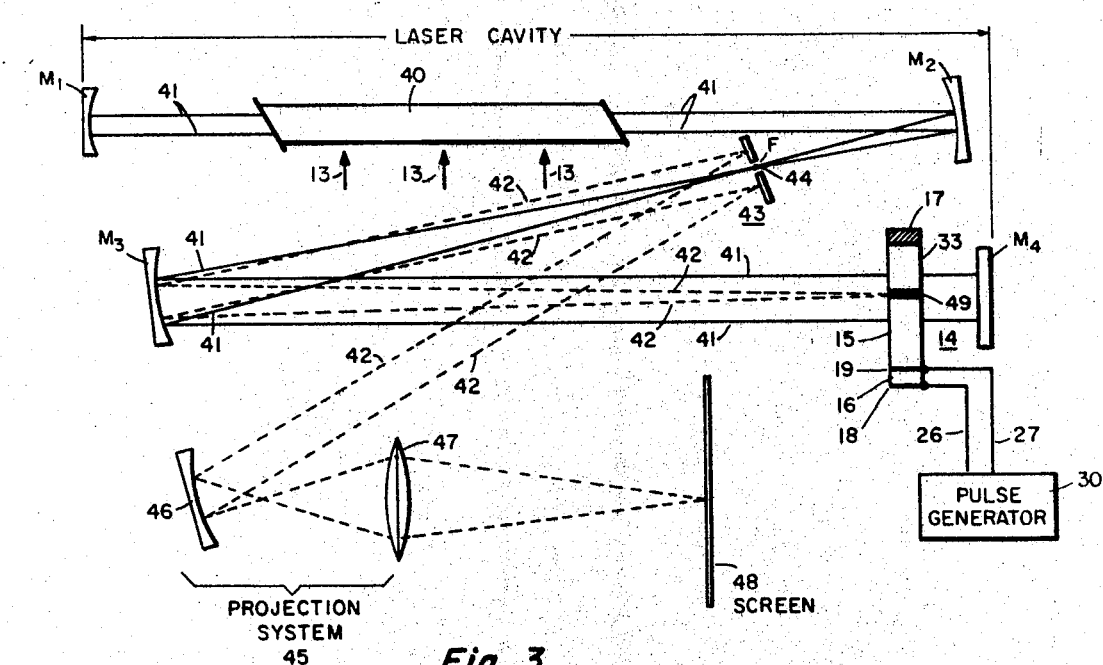
FIG. 3 is a schematic diagram of a 4-mirror image generating apparatus having a scanning device and spatial filter located within a laser cavity.

A modification of the image generator of FIG. 1 is shown schematically in FIG. 3. In this deflector, the laser cavity consists of four totally reflecting mirrors $M_1$, $M_2$, $M_3$ and $M_4$. A gas laser discharge tube 40 containing argon gas is located between mirrors $M_1$ and $M_2$ and a scanning device 14 of the type shown in FIG. 2 is placed between mirrors $M_3$ and $M_4$. Mirror $M_1$ has a long radius as in conventional two-mirror cavities whereas mirror $M_2$ has a relatively short radius designed to bring the coherent beam to a focus at point F. The expanded beam is collimated at mirror $M_3$ and reflected to mirror $M_4$ which terminates the cavity. This configuration results in an enlarged cylindrical beam between mirrors $M_3$ and $M_4$ and since the beam is internal to the cavity, it is much more intense than a beam of similar diameter obtainable through a partially transmitting mirror of the type normally used at one or both ends of the usual laser cavity. The laser beam circulating within the cavities is indicated by the solid lines 41.

When the scanner 14 is energized by applying a voltage from pulse generator 30 across transducer 16, a narrow shear pulse is transmitted down delay line 14 producing an incremental scanning birefringent volume. As has been explained in connection with FIGS. 1 and 2, plane polarized light generated within the cavity by the gas mixture within tube 40 emerges from the incremental volume polarized in the direction normal to the polarization of the original beam. The orthogonally polarized component is narrow in extent (on the order of 0.1 to 0.2 millimeter) and therefore diverges by diffraction as shown by the dashed lines 42. This component becomes sufficiently larger than the focused beam at F to permit it to be separated from the internal beam by a spatial filter 43.

Spatial filter 43 comprises a flat mirror obliquely positioned with respect to the portion of beam 42 reflected from mirror $M_3$. The filter 43 is provided with a central aperture 46 which permits the internal beam 41 to pass through while reflecting the divergent beam 42. Beam 42 is reflected out of the laser cavity to a projection system 45 consisting of a mirror 46 and lens 47 which images the beam onto a screen 48.

As the pulse produced by exciting transducer 16 travels across delay line 15, the plane coherent wave front of the internal beam 41 suffers a perturbation as it passes through the incremental volume 49 being stressed. The stressed volume travels along the delay line causing a corresponding scan line to be produced on the screen as each shear pulse moves across the laser beam 41. A repetitive linear scan can be produced by applying a sequence of pulses to transducer 16 at the desired scan rate.

Since scanner 14 is located inside the laser cavity, intense light passes through it in both directions. Consequently, the projection system 45 must image both delay line 15 and its virtual image in mirror $M_4$. For this to occur, delay line 14 should be very close to mirror $M_4$ and this may be accomplished by depositing a multiple-layer dielectric coating directly on surface 33 of the delay line. It shall be noted that if scanner 14 were located outside the cavity, the light which does not impinge on the incremental stressed volume would be entirely wasted instead of being recirculated with the cavtiy.

In a typical embodiment of the image generator shown in FIG. 3, mirror $M_1$ has a 3-meter radius of curvature, $M_2$ a radius of 0.6 meter, $M_3$ a 3.5-meter radius and $M_4$ is flat. Using a discharge tube 40 containing argon, beam magnifications as high as 40 have been obtained resulting in an internal beam 41 between mirrors $M_3$ and $M_4$ over 5 centimeters in diameter.

Figure 4:
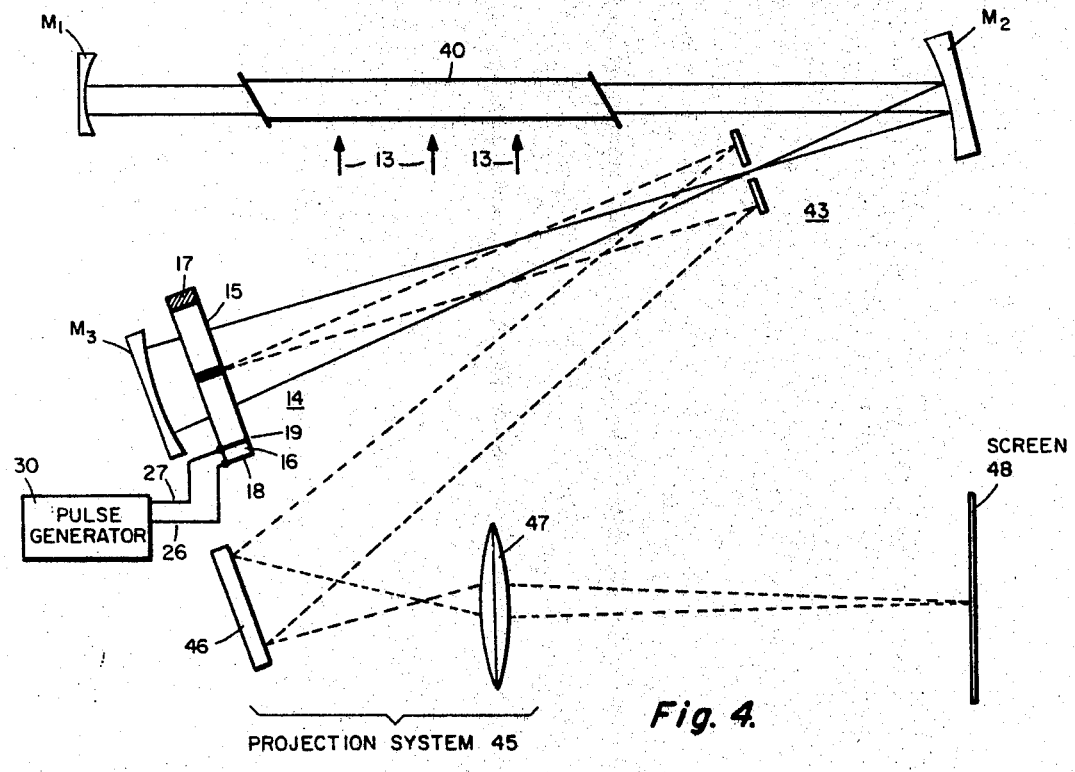
FIG. 4 is a schematic diagram of an apparatus similar to that of FIG. 3 but employing a 3-mirror cavity.

FIG. 4 shows a modification of the 4-mirror cavity of FIG. 3 which employs only 3 mirrors. In this device, the scanner 14 is placed in the cavity between the spatial filter 43 and mirror $M_3$, preferably as close to mirror $M_3$ as possible. The operation of the deflector of FIG. 4 is essentially the same as that of FIG. 3 and will not therefore be repeated. The embodiment of FIG. 4 has the advantage that it uses one less mirror than that of FIG. 3, thereby reducing its complexity and simplifying alignment problems. However, the beam diverges slightly in passing through delay line 15, which causes the resolution to be smaller.

Summarizing, the image generator I have invented employs a multiple mirror or mirror and and lens configuration to achieve an enlarged collimated laser beam within the laser cavity. By making use of the extremely large amount of circulating light power within the cavity (typically 100 times larger than the maximum power that can be extracted) it is possible to illuminate the surface of the scanner 14 with a highly intense and well collimated beam.

An image is formed of the pulse being propagated down the delay line 15 of scanner 14. The entire line 15 is illuminated at all times, even though only a small portion of the light energy is perturbed and coupled out of the cavity. The portion which is not coupled out of the cavity continues to circulate within the cavity which would not be true if a deflector external to the cavity were employed.

While my invention may be used with either a polarization coupler or a spatial filter, the spatial filter is preferable. This is because the polarization coupler responds only to changes in the direction of polarization of the light striking it. The apertured mirror used as a spatial filter, on the other hand, couples out any difference between the light returned from the scanner and the plane coherent wave circulating within the cavity. These differences can be phase, amplitude or polarization modulation effects.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. Apparatus for generating a light beam having a position responsive to an input voltage comprising
 (a) an optical resonant cavity having first and second spaced reflecting surfaces,
 (b) an active laser medium disposed within said cavity adjacent said first reflecting surface, said medium when stimulated by a source of external energy emitting a polarized beam of coherent radiation, said beam being plane polarized in a first direction,
 (c) a piezoelectric delay line disposed within said cavity between said laser medium and said second reflecting surface, said piezoelectric delay line being positioned within said plane polarized beam, said delay line in the absence of an input voltage transmitting said plane polarized beam essentially without distortion,
 (d) a transducer secured to one end of said piezoelectric delay line having first and second electrodes affixed thereto, said transducer producing an acoustic shear wave in said delay line when said input voltage is appiled across said electrodes, the light emerging from the stressed portion of said piezoelectric delay line being plane polarized in a second direction orthogonal to said first direction, and
 (e) a birefringent prism positioned between said delay line and said second reflecting surface, said prism deflecting the beam polarized in said first direction to impinge on said second reflecting surface and deflecting the beam polarized in said second direction out of said cavity.

2. Apparatus for generating a light beam as defined by claim 1 wherein lens means for enlarging said beam is located between said laser medium and said piezoelectric delay line.

3. Apparatus for generating a light beam as defined by claim 2 wherein said prism is oriented such that the angle of deflection of the beam polarized in said second direction at a specified time is dependent upon the position of the stressed portion of said piezoelectric delay line at said time.

4. Apparatus for generating a light beam having a position responsive to an input voltage comprising
  (a) an optical resonant cavity comprising first, second, third and fourth spaced mirrors, said second mirror being opposite said first and third mirrors and said fourth mirror being opposite said third mirror, said first and fourth mirrors comprising the end mirrors of said cavity,
  (b) an active laser medium disposed within said cavity between said first and second mirrors, said medium when stimulated by a source of external energy emitting a beam of coherent radiation,
  (c) signal responsive means disposed within said cavity between said third and fourth mirrors, said means in the absence of a signal transmitting said beam of coherent radiation essentially without distortion,
  (d) excitation means coupled to said signal responsive means for producing a change in the optical properties of said means at preselected regions thereof, said change in optical properties causing a perturbation in the portion of the coherent beam leaving said means at the preselected region, and
  (e) a spatial filter disposed within said cavity between said second and third mirrors, said spatial filter comprising a reflecting surface having an aperture therein, said undistorted beam of coherent radiation passing through said aperture and the perturbed portion of said beam impinging on the reflecting surface of said filter, the perturbed portion of said beam being reflected out of said cavity by said surface.

5. Apparatus as defined by claim 4 wherein said second mirror focuses said coherent beam at a point located between said second and third mirrors, said spatial filter being positioned at said focal point.

6. Apparatus as defined by claim 4 wherein said signal responsive means comprises a piezoelectric element and said excitation means comprises a transducer secured to one end of said piezoelectric element, said transducer having first and second electrodes affixed thereto.

7. Apparatus as defined by claim 6 wherein said fourth mirror is adjoining the surface of said piezoelectric element.

8. Apparatus as defined by claim 4 which further comprises a fifth mirror for receiving said perturbed light from the reflecting surface of said spatial filter.

9. Apparatus for generating a light beam having a position responsive to an input voltage comprising
  (a) an optical resonant cavity comprising first, second and third spaced mirrors, said second mirror being opposite said first and third mirrors, said first and third mirrors comprising the end mirrors of said cavity,
  (b) an active laser medium disposed within said cavity adjacent said first mirror, said medium when stimulated by a source of external energy emitting a polarized beam of coherent radiation, said beam being plane polarized in a first direction,
  (c) signal responsive means disposed within said cavity between said second and third mirrors adjoining said third mirror, said means in the absence of a signal transmitting said beam of coherent radiation essentially without distortion,
  (d) excitation means coupled to said signal responsive means for producing a change in the optical properties of said means at preselected regions thereof, said change in optical properties causing a perturbation in the portion of the coherent beam leaving said means at the preselected region, and
  (e) a spatial filter disposed within said cavity between said second and third mirrors, said spatial filter comprising a reflecting surface having an aperture therein, said undistorted beam of coherent radiation passing through said aperture and the perturbed portion of said beam impinging on the reflecting surface of said filter, and the perturbed portion of said beam being reflected out of said cavity by said surface.

10. Apparatus for generating a beam of electromagnetic radiation having a position responsive to an input signal comprising:
  (a) a resonant cavity having at least first and second spaced reflecting surfaces,
  (b) an active laser medium disposed within said cavity, said medium when stimulated by a source of external energy emitting a beam of coherent radiation which is plane polarized in a first direction,
  (c) signal responsive means disposed within said cavity and positioned within said beam, said means in the absence of a signal transmitting said beam of coherent radiation essentially without distortion,
  (d) excitation means coupled to said signal responsive means for producing a change in the optical properties of said means at preselected regions thereof, said change in optical properties causing the beam emerging from the preselected region of said signal responsive means to be plane polarized in a second direction orthogonal to said first direction, and
  (e) a birefringent prism positioned adjacent to said signal responsive means, said prism deflecting the beam polarized in said first direction to impinge on one of said reflecting surfaces and deflecting the beam polarized in said second direction out of said cavity.

11. Apparatus for generating a beam of electromagnetic radiation having a position responsive to an input signal comprising:
  (a) a resonant cavity having at least first and second spaced reflecting surfaces,
  (b) an active laser medium disposed within said cavity, said medium when stimulated by a source of external energy emitting a beam of coherent radiation,
  (c) signal responsive means disposed within said cavity and positioned within said beam, said means in the absence of a signal transmitting said beam of coherent radiation essentially without distortion,
  (d) excitation means coupled to said signal responsive means for producing a change in the optical properties of said means at preselected regions thereof, said change in optical properties causing a perturbation in the portion of the coherent beam leaving said means at the preselected region, and
  (e) a spatial filter disposed within said cavity and positioned within said beam, said spatial filter comprising a reflecting surface having an aperture therein, the undistorted portion of said coherent beam passing through said aperture and said perturbed portion impinging on the reflecting surface of said filter.

References Cited

UNITED STATES PATENTS

| | | | |
|---|---|---|---|
| 3,286,193 | 11/1966 | Koester et al. | 331—94.5 |
| 2,797,619 | 12/1951 | Rosenthal | 88—61 |
| 3,243,724 | 3/1966 | Vuylsteke | 331—94.5 |
| 3,297,876 | 1/1967 | De Maria | 250—199 |
| 3,372,973 | 3/1968 | Flinchbaugh | 350—161 |

OTHER REFERENCES

"Frequency Translation of an He-Ne Laser's Output Frequency by Acoustic Output Coupling Inside the Resonate Cavity"; A. E. Siegman et al.; Applied Physics, letters; July 1964, vol. 5, No. 1.

"Digital Light Deflection"; T. J. Nelson; The Bell System Technical Journal; vol. 43, No. 3, May 1964.

RONALD L. WIBERT, Examiner

C. CLARK, Assistant Examiner